INVENTORS.
ROBERT A. LAUDUCCI
MORRIS H. STEVENS

BY Head & Johnson
ATTORNEYS

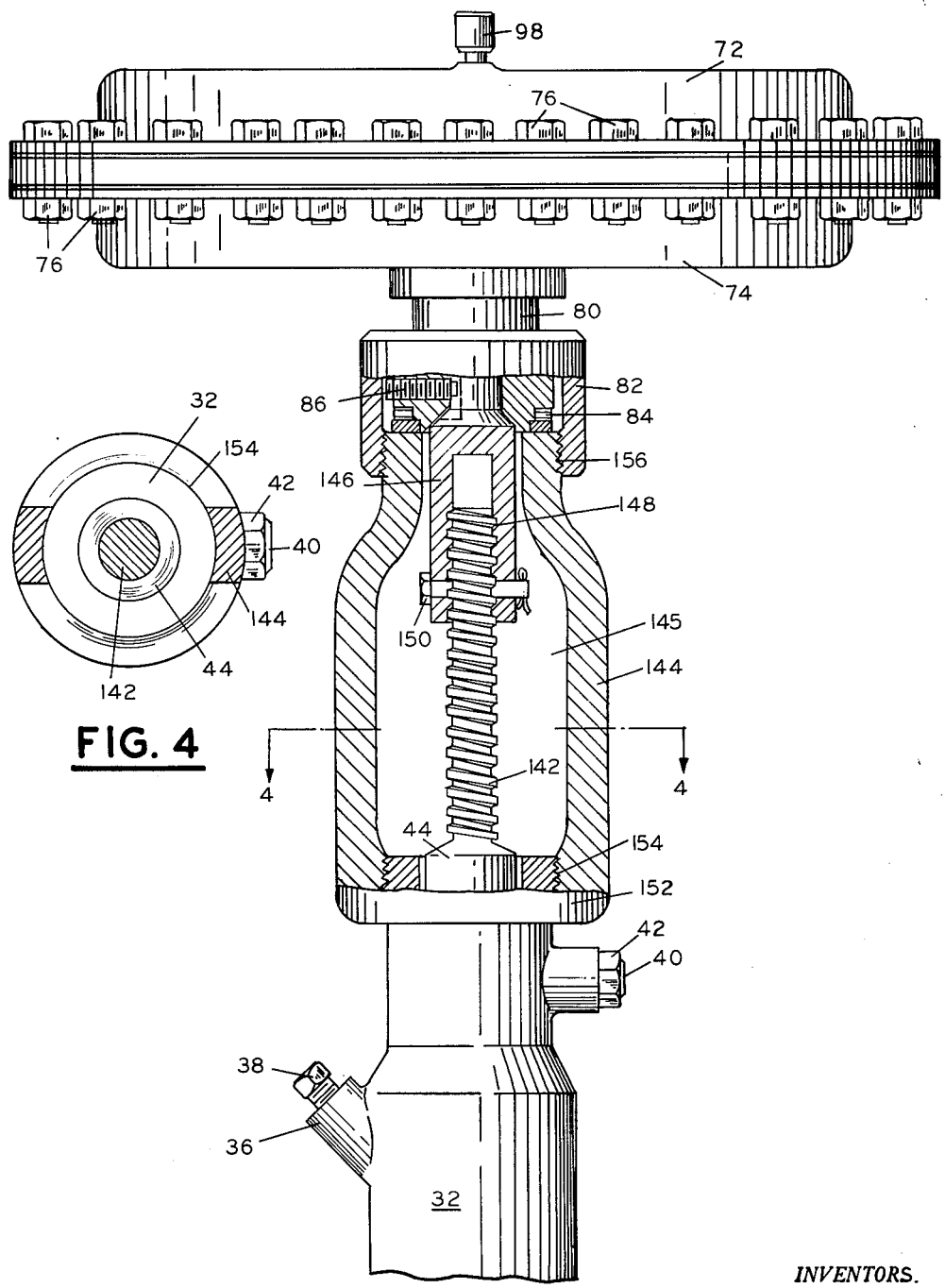

INVENTORS.
ROBERT A. LAUDUCCI
MORRIS H. STEVENS

BY *Head & Johnson*
ATTORNEYS

[United States Patent Office — 3,207,468 — Patented Sept. 21, 1965]

3,207,468
VALVE OR THE LIKE HAVING A PRESSURE FLUID ACTUATED TRANSDUCER
Robert A. Lauducci and Morris H. Stevens, both of Tulsa, Okla., assignors to Orbit Valve Company, Tulsa, Okla., a corporation of Oklahoma
Filed Aug. 30, 1961, Ser. No. 135,011
7 Claims. (Cl. 251—58)

This invention relates to valves and more particularly to valves having pressure fluid actuated transducers for use in conjunction with fluid flow control valves and the like.

For the most part valves are manually operated by a hand-wheel device mechanically connected to open, close, or control the flow of fluids through the valve. Recent interest, however, is focused upon automatic control of fluid flow processes and, hence, replacement of manual operations. Many of these applications require such fluid flow control as a function of some operating condition.

The force required to operate most valves depends, to a great extent, upon the size and type of valve, the flow pressure conditions, and the mechanical advantage obtainable through the operating linkages.

Accordingly, it is an object of this invention to provide a fluid pressure operated transducer with mechanisms such as valves, indexing machines or structures requiring rotary movement for their operation.

It is another object of this invention to provide a valve having a pressure fluid actuated transducer which is particularly adapted to actuate valve stems normally requiring linear movement to rotate a valve core and/or move the valve core into its seat within a valve body.

Another object of this invention is to provide a valve having a pressure fluid operated transducer of the diaphragm or piston and cylinder motor type in which the linear movement of the diaphragm or piston directly operates a valve stem of the type used in plug type valves requiring only rotary motion, or operates a valve stem of the type used in valves requiring rotary and linear movement.

Another object of this invention is to provide a valve having a pressure fluid actuated transducer of the diaphragm or piston and cylinder motor type which is directly attached to the valve body and valve stem where linear and rotational motion are required to open and close the interconnected valve core and where rotational motion of the valve stem is transferred directly to the diaphragm housing or the piston and cylinder providing exterior rotational movement with respect to the valve body.

A yet still further object of this invention is to provide a valve in which a pressure fluid actuated transducer of the diaphragm or piston and cylinder type provides linear movement to a valve stem thereof which is readily adapted to existing valves by replacing the manually operated mechanism without undue modification.

An even further object of this invention is to provide a valve having a pressure fluid actuated transducer of the type capable of transmitting linear motion to a valve stem thereof requiring same for operation of the valve and wherein rotational movement of the valve stem, also required for operation of the valve, is transferred to the transducer to provide an exterior rotational signal of the operation of the valve.

A yet additional object of this invention is to provide a valve having a pressure fluid actuated transducer of the diaphragm or piston and cylinder type which is operably connected to a valve stem thereof of the type requiring rotational or rotational and linear movement for operation of the valve, wherein control of the transducer occurs at a remote location or automatically from a given flow or process condition of the fluids passing through the valve.

These and other objects of this invention will become more apparent upon further reading of the specification and claims when taken in conjunction with the following illustrations of which:

FIGURE 3 is a further embodiment of this invention, shown partly in elevation and partly in section, showing an adaptation of apparatus constructed according to this invention for exitsing valve structures.

FIGURE 4 is a sectional view taken along the line 4—4 of FIGURE 3.

Briefly, this invention relates to a pressure fluid actuated transducer of the diaphragm or piston and cylinder type wherein the linear movement obtained from the diaphragm or piston directly connects with a valve stem requiring linear and/or rotational movement for moving a valve core to and between a normally closed and normally opened position. The rotational movement of the stem with respect to the valve body occurs through the cooperating effect of a guide slot on the stem with respect to a follower on the valve body. This rotational movement is directly transferred to the diaphragm or cylinder housing simultaneously and thus relieves stress on the diaphragm or piston and in addition provides a visual indication of the operational movement of the mechanism. The apparatus utilizes standard equipment and simplified parts and hence, eliminates the difficulties with internal stem-type swivel connections to accommodate the relative linear-rotary movement. A pressure fluid, such as compressed gas, is controllably operated to provide pressure above and below the diaphragm or piston respectively as required.

*Description*

Figure 1:
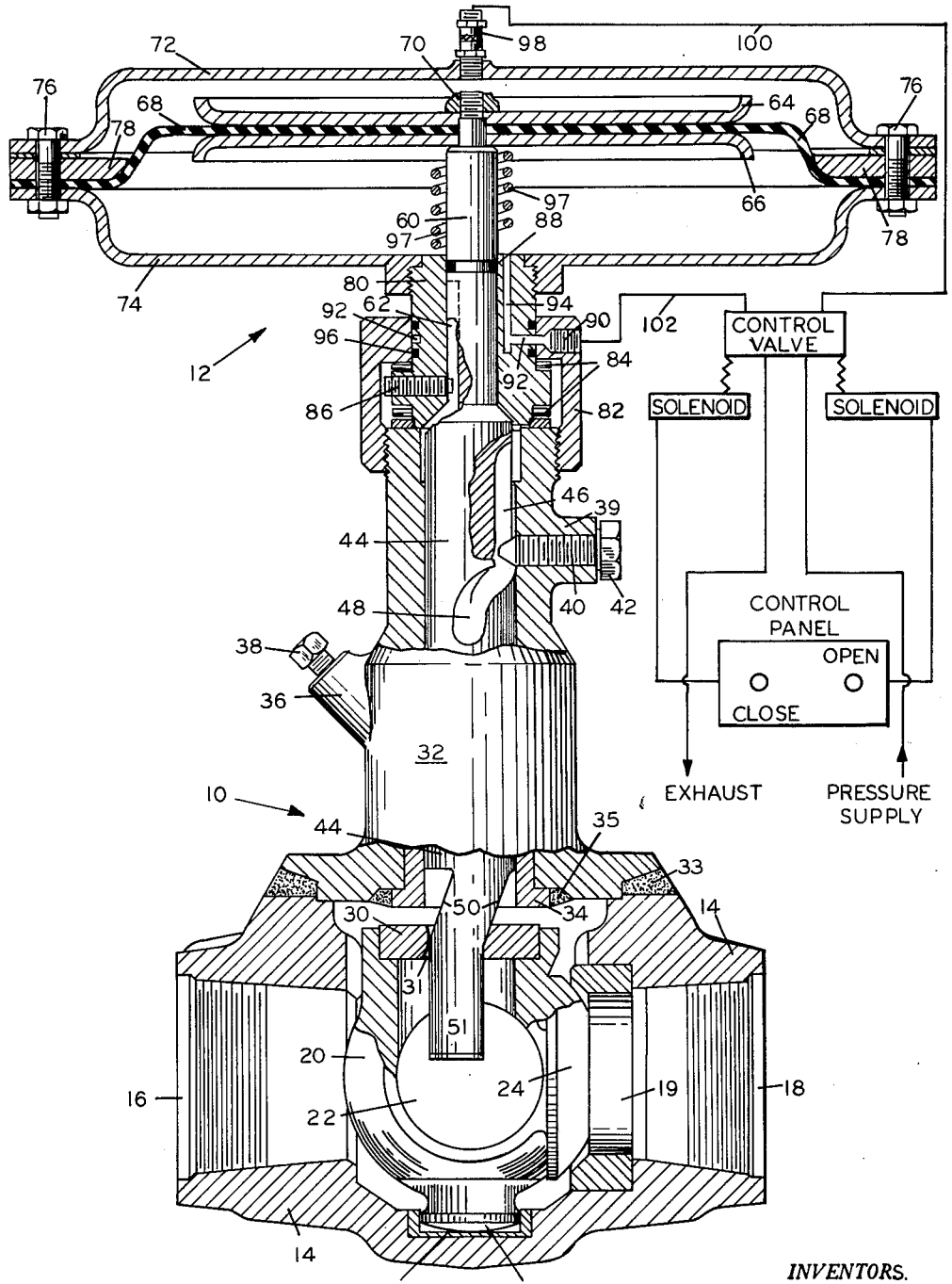
FIGURE 1 is an elevational view, partly in section, of a valve and pressure fluid operating mechanism constructed in accordance with this invention along with a schematic control circuit.

Referring now to the drawings and in particular FIGURE 1, the numeral 10 generally designates a valve of the plug type which is employed to control flow of high pressure fluids through a conduit. The numeral 12 generally refers to the pressure fluid actuated transducer of this invention, hereinafter described.

The valve includes a valve body 14 having a threaded inlet 16 and outlet 18 which is directly attachable to a flow conduit, not shown. Although a threaded connection is shown, it is to be understood that flange or weld-type connections can also be used. An insert type valve seat 19 is held adjacent outlet 18 within body 14 by a threaded, welded or shrink-fit connection. Seating core 20, of the spherical or ball-type is adapted with a flow through passageway 22 and seating face 24 adaptable to sealingly engage seal 19 in one position. The seating core 20 is provided with a lower trunnion 26 pivotal within bearing 28. This latter connection permits a tilting movement of the seating face 24, of core 20, into valve seat 19. A core insert 30 is adapted to the upper portion of seating core 20 and is provided with an opening 31 therein.

A valve bonnet 32 extends substantially vertically from valve body 14 where it is attached by weld 33. A bonnet insert or bushing 34 is welded to bonnet 32 by weld 35.

Packing bushing 36 and packing adjustment screw 38 are provided in the bonnet for providing lubrication and/or adjustments in packing rings, not shown, between the valve stem 44 and valve bonnet 32. A follower stem boss 39 is adapted to adjustably receive threaded follower stem 40 and jam nut 42. The stem 40 is laterally movable with respect to the recessed guide slot having a substantially vertical portion 46 and a lower semi-spiraled portion 48 of valve stem 44. The lower portion of valve stem 44 terminates with a substantially parallel angular portion 50 and vertical end portion 51 which cooperatively engages with opening 31 of core insert 30 and which provides the mechanical linkage required for rotational and tilting movement of seating core 20.

The above description refers quite generally to apparatus upon which the pressure fluid actuated transducer 12 of this invention is readily adaptable.

The upper modified portion of valve stem 44 is designated by the numeral 60 and includes a vertical guide slot 62. The upper valve stem 60 is directly and rigidly attached to overlying and flange plates 64 and 66, respectively, between which a relatively flexible diaphragm 68 is clamped and held by a threaded lock nut means 70. The diaphragm assembly is typical of the circular type available and includes an upper housing 72 and lower housing 74 all of which are circumferentially attached by a multiplicity of bolted connections 76. In those instances where the diaphragm assembly does not provide sufficient linear stroke, a spacer ring 78 is circumferentially provided and clamped between the upper and lower housings, as shown.

The lower diaphragm housing 74 includes drive sleeve 80 all of which is rotatably supported upon bearings 84 with respect to the fixed valve bonnet 32 and retainer ring 82. A guide pin, such as threaded set screw 86, is adjustably connected through drive sleeve 80 into vertical guide slot 62. The guide pin permits linear movement of upper valve stem 60 with respect to the drive sleeve 80, but directly imparts any rotational movement of the valve stem 60 into rotational movement of the drive sleeve 80, the attached diaphragm housing and parts above bearings 84. An O-ring seal 88 is provided with respect to the valve stem 60 and drive sleeve 80. A threaded pressure fluid supply connection 90 in retaining sleeve 82 directly connects with an annular slot 92 about the drive sleeve 80 which, in turn, connects with conduit 94 into the space below diaphragm 68. O-ring seals 96 above and below annular slot 92 in the drive sleeve provide a seal to prevent leakage of pressure fluids used in operating the diaphragm. In one embodiment a mechanical spring 97 may be used alone or as a force to supplement pressure fluids on one side or the other of diaphragm 68.

A swivel connection 98 provides an inlet to the upper side of the diaphragm 68 for pressure fluids supplied through conduit 100. Similarly, pressure fluids for operating on the under side of diaphragm 68 are supplied through conduit 102 into connection 90. A typical schematic control system for actuating transducer 12 is illustrated.

Figure 2:
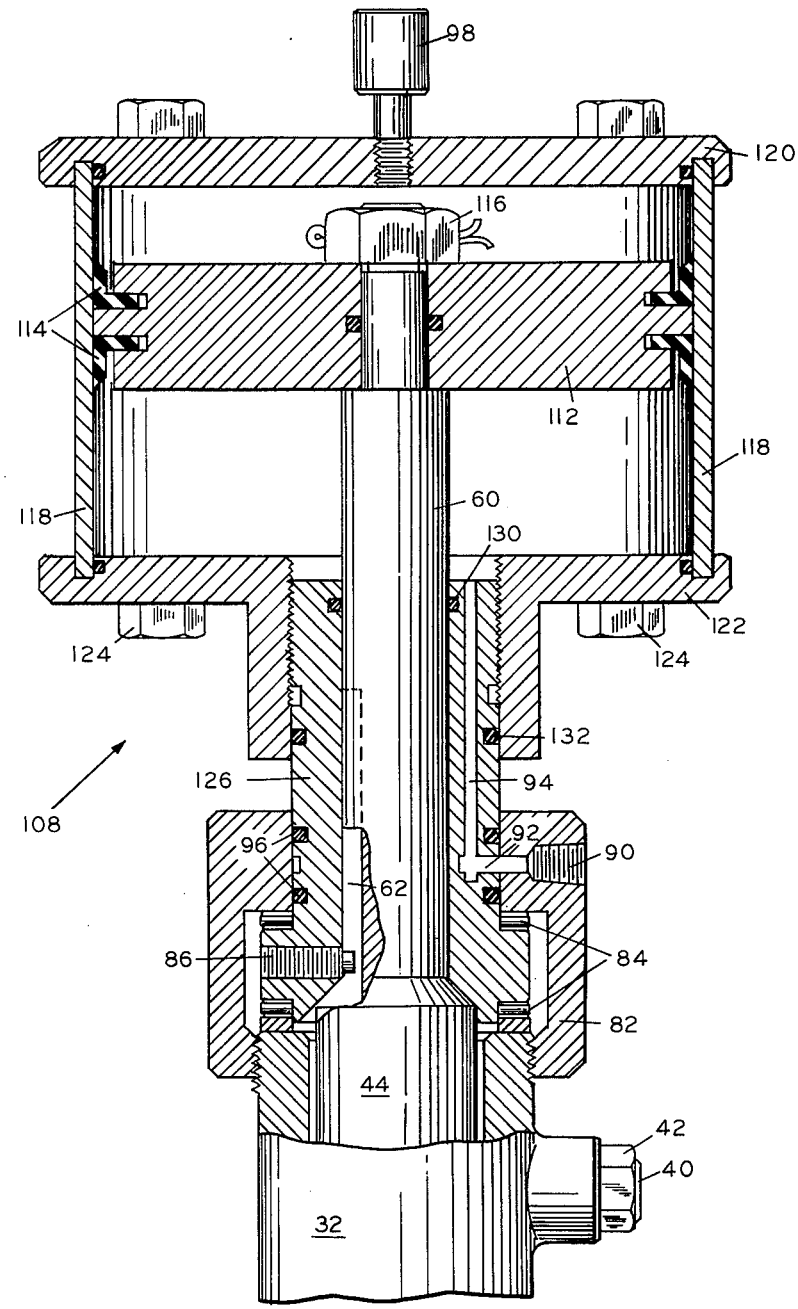
FIGURE 2 is a partial elevational and sectional view of a valve and an additional pressure fluid operating mechanism constructed within the scope of this invention.

Referring now to FIGURE 2, an additional embodiment of a pressure fluid actuated transducer 108 is described. Like portions as heretofore described are referred to with like numerals where said portions are the same or substantially the same. Valve stem 44 which is linearly and rotationally movable within valve bonnet 32 is provided with upper extension portion 60 which in turn is attached to piston 112 having piston rings 114 thereon. A threaded lock nut 116 retains the assembly together. The piston is movable within a cylinder 118 capped by an upper end 120 and a lower end 122 which assembly is held by external clamps, not shown, and locking nuts 124. Similar to the transducer mechanism of FIGURE 1, a drive sleeve 126 is rigidly connected as a part of the lower cylinder end 122 and adapted for rotational movement with respect to bonnet 32 and retainer sleeve 82, upon bearings 84. O-rings 130 and 132 provide a seal with respect to valve stem extension 60 and lower cylinder 122 respectively. Vertical guide slot 62 is provided along one side of the upper modified valve stem extension 60. The slot cooperates with guide 86 of drive sleeve 126 to cause rotational movement of the cylinder housing as stem 44 rotates.

Referring now to FIGURES 3 and 4, a yet additional embodiment of this invention is shown wherein pressure fluid actuated transducer of the type substantially shown in FIGURE 1 or 2 is adapted for attachment to a valve bonnet 32 and an unmodified valve stem 142, with the typical manually operated hand-wheel assembly removed from the top of bonnet 32. The transducer stem portion 146 includes an interiorly threaded opening 148 into which threaded portion 142 of valve stem 44 is threadably connectable. An extension linkage 144 is adapted to have a lower cylindrical portion 152 having interiorly formed threads 154 for attachment to the upper portion of valve bonnet 32. Two extension arms extend upwardly from the lower cylindrical portion and terminate with an upper cylindrical portion having exteriorly formed threads 156 thereon for threaded engagement with retainer sleeve 82. The upward extensions leave a working space 145 therebetween. A locking pin 150 is provided to retain threaded portion 142 of valve stem 44 within the threaded opening 148.

Figure 5:
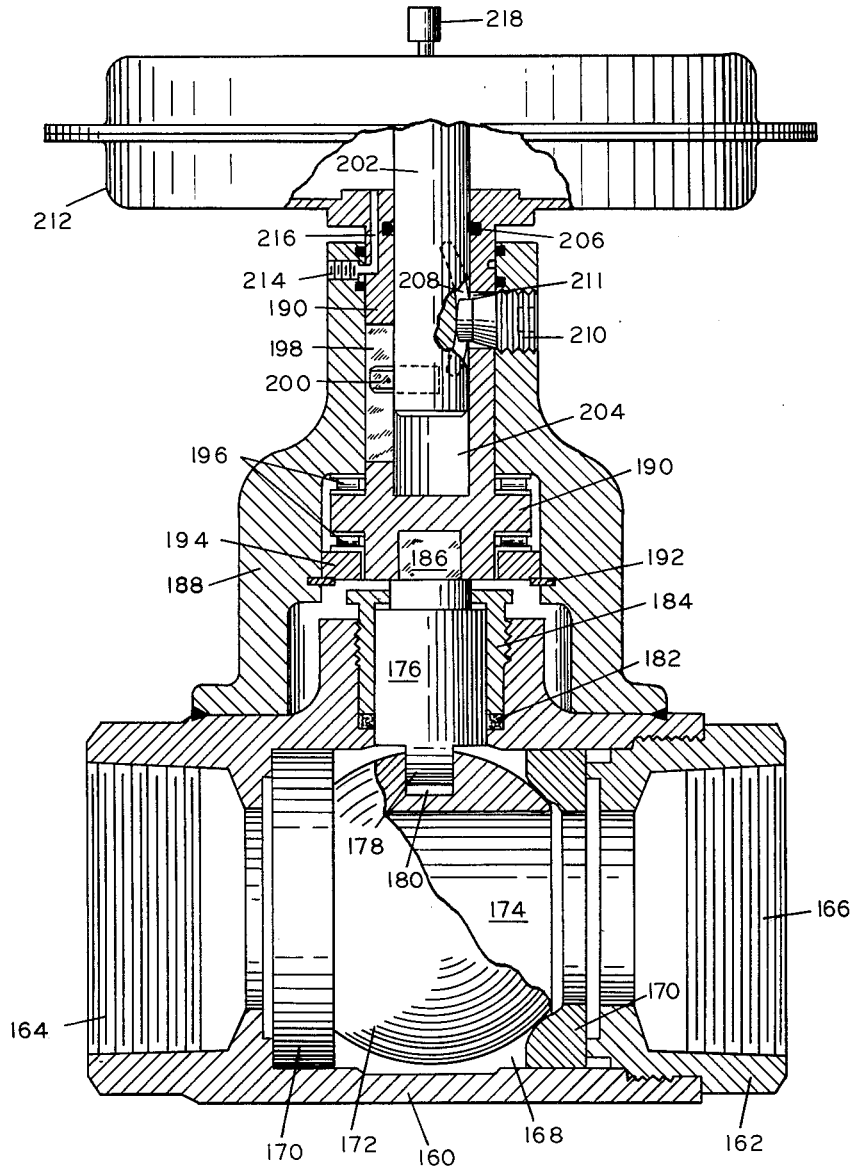
FIGURE 5 is an elevational view, partly in section, of the pressure fluid operating mechanism of this invention as constructed to operate a plug-type (ball) valve.

FIGURE 5 illustrates the use of the transducer of this invention as adapted to a plug or ball type valve where operation of the valve occurs by rotary motion of the valve stem. The valve includes interconnected body portions 160 and 162 forming an inlet 164 and outlet 166 defining a chamber 168 therebetween. Within the chamber are opposed valve seats 170 which are in sealed contact with the spherical ball-type core 172 having flow passage 174 therethrough. Valve stem 176 includes lower protrusion 178 cooperatively engaged with slot 180 of the valve core 172. Stem 176 is sealingly held in the valve body by packing 182 and gland nut 184. The upper portion of the stem includes male socket portion 186.

Welded to the valve body upwardly is valve bonnet 188. Within the bonnet is drive sleeve 190 which is retained therein by keeper ring 192 and support 194. Bearings 196 permit rotational movement of the sleeve with respect to the bonnet. A female socket at the lower end of the sleeve is adapted to receive matching socket 186. A straight slot 198 is along one side of the sleeve to receive pin 200 which protrudes from diaphragm shaft 202. The shaft is linearly movable within cylindrical support 204 of the drive sleeve. O-ring 206 seals between the shaft 202 and drive sleeve 190.

A spiral guide slot 208, shown partially cut away and partially in dotted line, is provided on the shaft 202 and receives guide pin 210 which is threadably adjustable to bonnet 188. Drive sleeve 190 includes circumferential slot 21 to permit the 90° movement of the drive sleeve with respect to pin 210.

Shaft 202 is directly attached to a linear actuated device such as the diaphragm or piston type heretofore described. The cylinder or housing 212 is rigidly attached to and becomes a part of drive sleeve 190.

Connection 214 and channel 216 sealed with respect to drive sleeve 190 provides pressure fluid to the lower side of the diaphragm, while swivel connection 218 provides pressure fluid to the upper side of the diaphragm. In some instances mechanical spring force is utilized to normally bias the diaphragm in one position of the valve or another.

Operation

The operation of this invention is best described with reference to the illustrations and in particular to FIGURE 1. The pressure fluid actuated transducer 12 is adapted to replace the typically used hand-wheel for imparting linear movement to the valve stem 44, which movement is adapted to operate the seating core to and between a normally closed and normally opened position with respect to the flow conduit. In the embodiment of FIGURE 1, valve stem 44 is provided with a modified upper extension portion 60. When the seating core 20 is in the full open position, i.e., a full flow passageway is provided through the valve from inlet 16 through opening 22 and outlet 18, valve stem 44 is in its uppermost position with follower stem 40 within the lower most spiral portion 48 of the guide slot. At the lower end of the valve stem 44 angular portion 50 is out of engagement with the core insert opening 31 and vertical portion 51 is therein engaged. Similarly, the upwardly attached diaphragm 68 and diaphragm flanges 64 and 66 are within the upper portion of diaphragm housings 72 and 74.

When it is desired to operate the valve, either automatically from some condition responsive actuator or from a remote control, pressure fluid such as compressed gas passes through conduit 100, through swivel connection 98 and thence into the upper portion above diaphragm 68. The control valve likewise permits exhaust from the under side of the diaphragm 68 through passageway 94, annular slot 92, connection 90 and passageway 102. Accordingly, the diaphragm assembly and valve stem are vertically moved downward. The configuration of spiral groove 48 in relation to the fixed follower stem 40 causes, during the downward movement, the valve stem to rotate in a clockwise manner to a position approximately that shown in FIGURE 1. This rotary movement of the valve stem is transferred by vertical guide slot 62 against guide pin 86 attached to drive sleeve 80 and likewise imparts rotary movement to the entire diaphragm housing assembly about bearings 84. Continued linear movement by the application of pressure fluid on the upper side of diaphragm 68 positions follower stem 40 opposite vertical guide slot portion 46. Additionally, tapered portion 50 at the lower end of valve stem 44 is now operable within core insert opening 31 to cause the seating core to tilt about the lower trunnion into engagement with valve seat 19, where the flow passageway is now shut off.

To open the valve the procedure is reversed, i.e., the control valve is actuated to exhaust the pressure fluids above the diaphragm 68. The mechanical spring and/or pressure fluids in conduit 102 to the under side of diaphragm 68 forces the diaphragm and its attached valve stem assemblies upward. The upward movement continues linearly until the follower stem 40 enters the spiral guide slot 48 for rotational movement of the valve stem, transducer 12 and the seating core to the full opened position.

Similarly, the transducer of FIGURE 2 operates to control the opening and closing of the valve, not specifically shown. The application of pressure fluid through swivel connection 98 into the chamber above piston 112, while exhausting the space below the piston, causes piston 112 to move downward in a linear manner. However, due to the rotational movement imparted by the follower and guide slot system, previously described, the stem extension 60 is rotated. This rotational movement is imparted to the assembled cylinder 118 and piston arrangement through the rotational engagement of guide slot 62 with respect to guide pin 86 attached to drive sleeve 126.

The operation of the pressure fluid actuated transducer of FIGURE 3 is similar to that heretofore described in FIGURES 1 and 2. The apparatus, however, is adapted for ready placement upon valves and valve stems wherein the usual hand-wheel type of operating mechanism is removed. Adaptor and extension 144 is threaded upon the top of bonnet 32. With the valve stem in its fully opened position, the transducer assembly, including valve stem adaptor 146 and its internally threaded opening 148, is attached to the extension by means of retainer sleeve 82. The diaphragm housing and drive sleeve assembly are thereupon rotated with respect to threaded valve stem 142 to a position where the diaphragm is in its corresponding upper most operating position. An opening is drilled through actuator stem adaptor 146, and threaded stem 142 when positioned opposite working space 145 between the extension linkages 144. Thereafter a locking pin 150 is threadably or in some manner attached through all the parts to retain the parts in fixed position.

The operation of the embodiment of FIGURE 5 is similar to that described in that the diaphragm housing rotates upon actuation of the transducer by pressure fluids or the like. Rotational movement of shaft 202 occurs upon linear actuation of the diaphragm or piston and cylinder, by the cooperative effect of guide 210 within spiral slot 208. The rotary movement is transferred to drive sleeve 190 and attached housing 212 by the action of pin 200, attached to shaft 202, against vertical slot 198. The rotary movement is supported by bearings 196 and by the direct socket connection 186 causes valve core 172 to rotate.

Although this invention has been described with reference to specific and preferred embodiments, this is not to be held as limiting. Accordingly, this invention should be limited only by the scope of the appended claims.

What is claimed:

1. A valve of the type having a valve core operable by the rotary motion of a valve stem to control flow through the valve body, comprising, in combination,
    a pressure fluid actuated transducer assembly to operarate the valve,
    the transducer assembly including a linearly movable element dividing a housing into first and second chambers,
    a drive sleeve attached to the housing,
    the drive sleeve rotatably supported to the valve body and attached to the valve stem,
    a shaft attached to the linearly movable element,
    the shaft linearly movable with respect to the drive sleeve,
    means interconnecting the shaft and valve body to cause the shaft to rotate upon linear movement of the shaft,
    means to alternately supply and exhaust pressure fluid to each of the first and second chambers to cause the linear movement,
    and means cooperatively engaging the shaft and the drive sleeve whereby the transducer assembly is caused to rotate with the shaft upon supplying pressure fluid to one of the first and second chambers and exhausting fluid from the other of the first and second chambers.

2. A valve including a valve stem, valve core and valve body, a guide slot and fixed follower means cooperatively situated relative to the stem and the body to permit linear movement of the stem and also transfer the linear movement into rotary movement to actuate the valve core, comprising, in combination:
    a transducer housing having a movable pressure fluid actuated linear force means directly attached to the stem,
    the housing rotatably supported to the valve body, and
    means interconnecting the valve stem and housing whereby the housing and force means are rotated sequential to linear movement of the force means and stem after applying pressure fluid to the force means.

3. A valve including a valve stem, valve core and valve body, a guide slot and fixed follower means cooperatively situated relative to the stem and the body to permit linear movement of the stem and also transfer the linear movement into rotary movement to actuate the valve core, comprising, in combination:

a pressure fluid actuated transducer assembly to operate the valve, the transducer assembly including a substantially axially movable diaphragm sealed to and dividing a housing thereabout into first and second chambers, the diaphragm attached to the valve stem, the housing rotatively supported to the valve body, spring means in one of said first and second chambers normally biasing said diaphragm in one linear direction, means in the other of the first and second chambers to alternately supply and exhaust pressure fluid thereto, and means cooperatively engaging between the valve stem and housing which permits linear movement of the valve stem with respect to the housing yet transfers rotary movement of the valve stem to the housing upon supplying or exhausting pressure fluid to the other of the first and second chambers.

4. A valve including a valve stem, valve core and valve body, a guide slot and fixed follower means cooperatively situated relative to the stem and the body to permit linear movement of the stem and also transfer the linear movement into rotary movement to actuate the valve core, comprising, in combination:

a pressure fluid actuated transducer to operate the valve, the transducer including a linearly movable element dividing a housing into upper and lower chambers, a drive sleeve attached to the housing and rotatably supported to the valve body by a retainer sleeve, the element attached to the valve stem, a vertical guide slot in the valve stem adjacent the drive sleeve, swivel means to supply pressure fluid to the upper chamber, a sealed conduit and slot in the drive sleeve interconnecting the lower chamber and a pressure fluid supply connection in the retainer sleeve, and a guide pin held by the drive sleeve contiguous with the guide slot, whereby the drive sleeve and housing are caused to rotate as the valve stem rotates upon supplying pressure fluid to one of the upper and lower chambers and exhausting pressure fluid from the other of the upper and lower chambers.

5. A valve including a valve stem, valve core and valve body, a guide slot and fixed follower means cooperatively situated relative to the stem and the body to permit linear movement of the stem and also transfer the linear movement into rotary movement to actuate the valve core, comprising, in combination:

a pressure fluid actuated transducer assembly to operate the valve, the transducer assembly including a substantially linearly movable diaphragm sealed to and dividing a housing thereabout into first and second chambers, the diaphragm attached to the valve stem, the housing rotatively supported to the valve, means to alternately supply and exhaust pressure fluid to each of the first and second chambers, and means cooperatively engaging between the valve stem and housing which permit linear movement of the valve stem with respect to the housing and transfers rotary movement of the valve stem to the housing upon supplying pressure fluid to one of the first and second chambers and exhausting pressure fluid from the other of the first and second chambers.

6. A valve including a valve stem, valve core and valve body, a guide slot and fixed follower means cooperatively situated relative to the stem and the body to permit linear movement of the stem and also transfer the linear movement into rotary movement to actuate the valve core, comprising, in combination:

a pressure fluid actuated transducer assembly to operate the valve, the assembly including a pressure responsive piston linearly movable relative to a housing and dividing the housing into first and second chambers, the pressure responsive piston including the valve stem, the housing rotatably supported to the valve body, means to alternately supply and exhaust pressure fluid to each of the first and second chambers, and means cooperatively engaging between the pressure responsive piston and the housing to permit the linear movement of the pressure responsive piston relative to the housing yet transfers the rotary movement of the valve to the housing which rotates the piston and housing therewith upon supplying said pressure fluid.

7. A pressure fluid actuated transducer for a device of the type actuated by an operator which moves linearly and/or rotatably with respect to the device, comprising:

a housing, a linearly movable element dividing the housing into first and second chambers, the element including means to attach to the operator, means to attach the housing to the device whereby the housing will rotate with respect to the device, means to alternately supply and exhaust pressure fluid into and from each of the first and second chambers, and means cooperatively engaging between the element and the housing which permits linear movement of the element with respect to the housing yet transfers rotary movement of the operator to the housing which rotates therewith upon supplying said pressure fluid.

References Cited by the Examiner

UNITED STATES PATENTS

| 623,873 | 4/99 | Borden | 251—58 |
| 2,200,010 | 5/40 | Orem | 137—505.47 XR |

FOREIGN PATENTS 1,089,232 9/60 Germany.

ISADOR WEIL, *Primary Examiner.*

WILLIAM F. O'DEA, MARTIN P. SCHWADRON,
*Examiners.*